United States Patent
Mongillo, Jr. et al.

(10) Patent No.: US 9,995,147 B2
(45) Date of Patent: Jun. 12, 2018

(54) BLADE TIP COOLING ARRANGEMENT

(71) Applicant: United Technologies Corporation, Hartford, CT (US)

(72) Inventors: Dominic J. Mongillo, Jr., West Hartford, CT (US); Jeffrey R. Levine, Vernon Rockville, CT (US); Kyle C. Lana, Portland, CT (US); Sasha M. Moore, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 417 days.

(21) Appl. No.: 14/619,343

(22) Filed: Feb. 11, 2015

(65) Prior Publication Data
US 2016/0230564 A1   Aug. 11, 2016

(51) Int. Cl.
*F01D 5/18*   (2006.01)
*F01D 5/20*   (2006.01)

(52) U.S. Cl.
CPC ............ *F01D 5/186* (2013.01); *F01D 5/187* (2013.01); *F01D 5/20* (2013.01); *F05D 2240/307* (2013.01); *F05D 2260/2214* (2013.01); *F05D 2260/22141* (2013.01); *Y02T 50/676* (2013.01)

(58) Field of Classification Search
CPC . F01D 5/186; F01D 5/187; F01D 5/20; F05D 2240/307; F05D 2240/2214; F05D 2240/22141; Y02T 50/676
See application file for complete search history.

(56) References Cited

U.S. PATENT DOCUMENTS

| | | | | |
|---|---|---|---|---|
| 3,220,697 A | * | 11/1965 | Smuland | F01D 5/187 416/96 R |
| 3,819,295 A | * | 6/1974 | Hauser | B23P 15/04 416/96 A |
| 4,515,523 A | * | 5/1985 | North | F01D 5/187 415/115 |
| 5,328,331 A | * | 7/1994 | Bunker | F01D 5/187 415/115 |
| 5,387,085 A | | 2/1995 | Thomas, Jr, et al. | |
| 5,403,159 A | | 4/1995 | Green et al. | |
| 5,779,447 A | * | 7/1998 | Tomita | F01D 5/187 416/97 R |

(Continued)

FOREIGN PATENT DOCUMENTS

| EP | 0661414 | 7/1995 |
|---|---|---|
| FR | 2147971 | 3/1973 |

OTHER PUBLICATIONS

European Search Report for European Patent Application No. 16155312 completed Sep. 7, 2016.

*Primary Examiner* — William McCalister
(74) *Attorney, Agent, or Firm* — Carlson, Gaskey & Olds, P.C.

(57) ABSTRACT

A turbine blade according to an example of the present disclosure includes, among other things, a platform, an airfoil tip, and an airfoil section between the platform and the airfoil tip. The airfoil section has a cavity spaced radially from the airfoil tip and a plurality of cooling passages radially between the cavity and the airfoil tip. Each of the plurality of cooling passages defines an exit port adjacent the airfoil tip. An internal feature within each of the plurality of cooling passages is configured to meter flow to the exit port.

13 Claims, 8 Drawing Sheets

(56) References Cited

U.S. PATENT DOCUMENTS

| | | | |
|---|---|---|---|
| 5,785,496 A * | 7/1998 | Tomita | F01D 5/187 416/191 |
| 6,152,695 A * | 11/2000 | Fukue | F01D 5/187 415/115 |
| 6,164,914 A | 12/2000 | Correia et al. | |
| 6,254,346 B1 * | 7/2001 | Fukuno | F01D 5/187 415/115 |
| 6,402,470 B1 | 6/2002 | Kvasnak et al. | |
| 6,811,378 B2 * | 11/2004 | Kraft | F01D 5/18 416/191 |
| 6,890,154 B2 * | 5/2005 | Cunha | F01D 5/187 415/115 |
| 6,910,864 B2 * | 6/2005 | Tomberg | F01D 5/187 416/90 R |
| 6,932,571 B2 | 8/2005 | Cunha et al. | |
| 6,997,679 B2 * | 2/2006 | Beddard | F01D 5/187 415/115 |
| 7,118,337 B2 | 10/2006 | Liang | |
| 7,572,102 B1 * | 8/2009 | Liang | B22C 9/103 415/115 |
| 7,654,795 B2 | 2/2010 | Tibbott | |
| 7,682,133 B1 * | 3/2010 | Liang | F01D 5/187 416/97 R |
| 7,819,169 B2 * | 10/2010 | Pietraszkiewicz | F01D 5/147 164/132 |
| 7,845,908 B1 | 12/2010 | Liang | |
| 8,092,179 B2 | 1/2012 | Paauwe et al. | |
| 8,172,507 B2 | 5/2012 | Liang | |
| 8,366,394 B1 | 2/2013 | Liang | |
| 8,469,666 B1 | 6/2013 | Liang | |
| 8,506,241 B1 | 8/2013 | Liang | |
| 8,777,572 B2 | 6/2014 | Cheong et al. | |
| 8,858,159 B2 | 10/2014 | Piggush et al. | |
| 8,920,124 B2 | 12/2014 | Lee | |
| 2013/0108416 A1 * | 5/2013 | Piggush | F01D 5/187 415/173.1 |
| 2013/0302179 A1 | 11/2013 | Bergholz, Jr. et al. | |
| 2014/0086724 A1 | 3/2014 | Tibbott et al. | |
| 2014/0271226 A1 | 9/2014 | Giglio et al. | |
| 2016/0230564 A1 * | 8/2016 | Mongillo, Jr. | F01D 5/186 |

* cited by examiner

BLADE TIP COOLING ARRANGEMENT

BACKGROUND

This disclosure relates to a film cooling arrangement for a turbine blade of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

SUMMARY

A turbine blade according to an example of the present disclosure includes a platform, an airfoil tip, and an airfoil section between the platform and the airfoil tip. The airfoil section has a cavity spaced radially from the airfoil tip and a plurality of cooling passages radially between the cavity and the airfoil tip. Each of the plurality of cooling passages defines an exit port adjacent the airfoil tip. An internal feature within each of the plurality of cooling passages is configured to meter flow to the exit port.

In a further embodiment of any of the foregoing embodiments, each of the cooling passages is configured to eject coolant onto an external surface of the airfoil tip.

In a further embodiment of any of the foregoing embodiments, the plurality of cooling passages includes a first cooling passage and a second cooling passage. The first cooling passage defines a first passage angle relative to a reference axis, and the second cooling passage defines a second, different passage angle relative to the reference axis.

In a further embodiment of any of the foregoing embodiments, each of plurality of cooling passages defines an inlet port at the cavity, and the internal feature is spaced from the inlet port.

In a further embodiment of any of the foregoing embodiments, the internal feature is radially spaced a distance equal to or greater than 1.0 hydraulic diameters from the exit port, wherein the hydraulic diameters is defined relative to a minimum cross-sectional flow area and a wetted perimeter of the cooling passage.

In a further embodiment of any of the foregoing embodiments, each exit port of the plurality of cooling passages includes one of a rectangular, elliptical, round, oval, teardrop, tapering, diffusing and converging-diverging geometry.

A further embodiment of any of the foregoing embodiments includes at least one cooling feature within the cavity.

In a further embodiment of any of the foregoing embodiments, the at least one cooling feature is a plurality of pedestals between opposed walls of the cavity.

In a further embodiment of any of the foregoing embodiments, the airfoil section defines a shelf in the airfoil tip radially inward of a sealing portion of the airfoil tip, and the exit port is located in the shelf.

In a further embodiment of any of the foregoing embodiments, the shelf extends between a leading edge and a trailing edge of the airfoil section.

In a further embodiment of any of the foregoing embodiments, the sealing portion includes a sealing surface configured to provide a seal with a portion of a gas turbine engine.

In a further embodiment of any of the foregoing embodiments, at least one throat is defined between the internal feature and a wall of one of the plurality of the cooling passages.

In a further embodiment of any of the foregoing embodiments, the exit port and the internal feature are spaced from a leading edge and a trailing edge of the airfoil section.

In a further embodiment of any of the foregoing embodiments, the exit port is defined at the airfoil tip.

A gas turbine engine according to an example of the present disclosure includes a rotor spaced radially from a blade outer air seal. The rotor includes a platform, an airfoil tip, and an airfoil section between the platform and the airfoil tip. The airfoil section has a cavity between pressure and suction sides of the airfoil section, and a plurality of cooling passages radially between the airfoil tip and the cavity. The plurality of cooling passages define an array of exit ports adjacent the airfoil tip. The array of exit ports are configured to eject fluid onto external surfaces of the airfoil tip. A plurality of internal features within the plurality of cooling passages is configured to meter flow to the array of exit ports.

In a further embodiment of any of the foregoing embodiments, each of the plurality of cooling passages defines a passage axis intersecting a surface of the blade outer air seal.

In a further embodiment of any of the foregoing embodiments, the airfoil tip and the blade outer air seal are spaced radially to define a radial gap, and the array of exit ports are configured to eject fluid into the radial gap to form a seal.

In a further embodiment of any of the foregoing embodiments, the array of exit ports are located radially along the radial gap, and the plurality of internal features are spaced from the radial gap.

In a further embodiment of any of the foregoing embodiments, the array of exit ports includes a first pair of exit ports along an exit plane spaced by a partition within the airfoil section. The partition defines a first distance along the exit plane. The first pair of exit ports defines a second distance along the exit plane, and a ratio of the first distance to the second distance is equal to or less than 0.3.

In a further embodiment of any of the foregoing embodiments, the airfoil section defines a shelf extending radially inward of a sealing portion of the airfoil tip, and the array of exit ports are radially aligned with a surface of the shelf.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
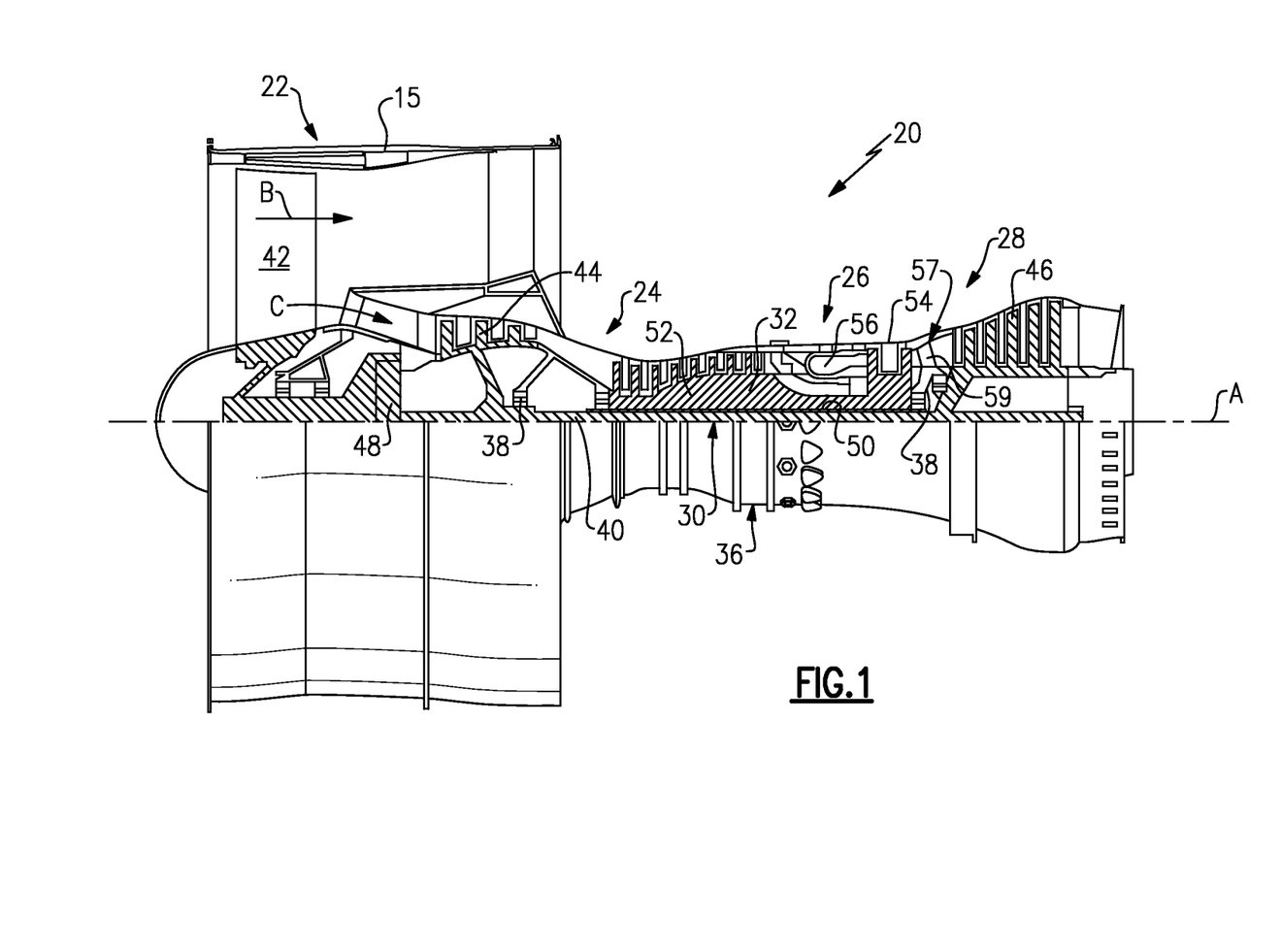
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
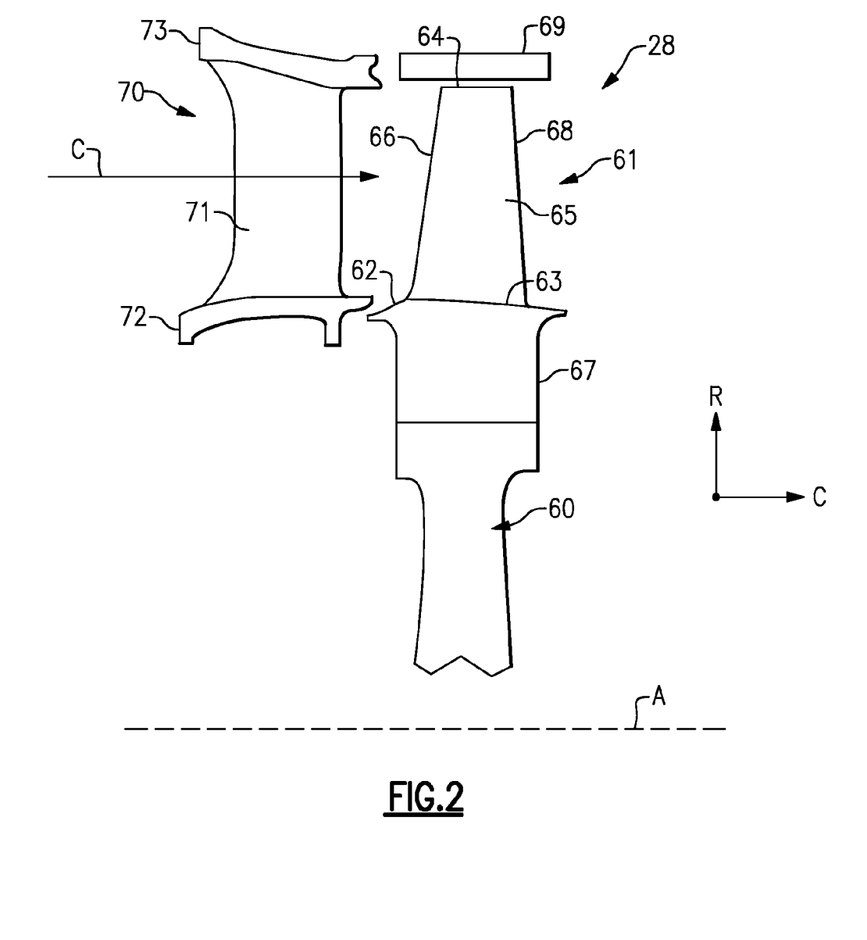
FIG. 2 schematically shows an airfoil arrangement for a turbine section.

FIG. 2 shows selected portions of the turbine section 28 including a rotor 60 carrying one or more airfoils 61 for rotation about the central or engine axis A. In this disclosure, like reference numerals designate like elements where appropriate and reference numerals with the addition of one-hundred or multiples thereof designate modified elements that are understood to incorporate the same features and benefits of the corresponding original elements.

In this example, each airfoil 61 includes a platform 62 and an airfoil section 65 extending in a radial direction R from the platform 62 to a tip 64. The airfoil section 65 generally extends in a chordwise direction C between a leading edge 66 to a trailing edge 68. A root section 67 of the airfoil 61 is mounted to the rotor 60, for example. It should be understood that the airfoil 61 can alternatively be integrally formed with the rotor 60, which is sometimes referred to as an integrally bladed rotor (IBR). A blade outer air seal (BOAS) 69 is spaced radially outward from the tip 64 of the airfoil section 65 to bound a portion of the core flow path C. A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes multiple airfoils 61, vanes 70, and blade outer air seals 69 arranged circumferentially about the engine axis A.

Figure 3A:
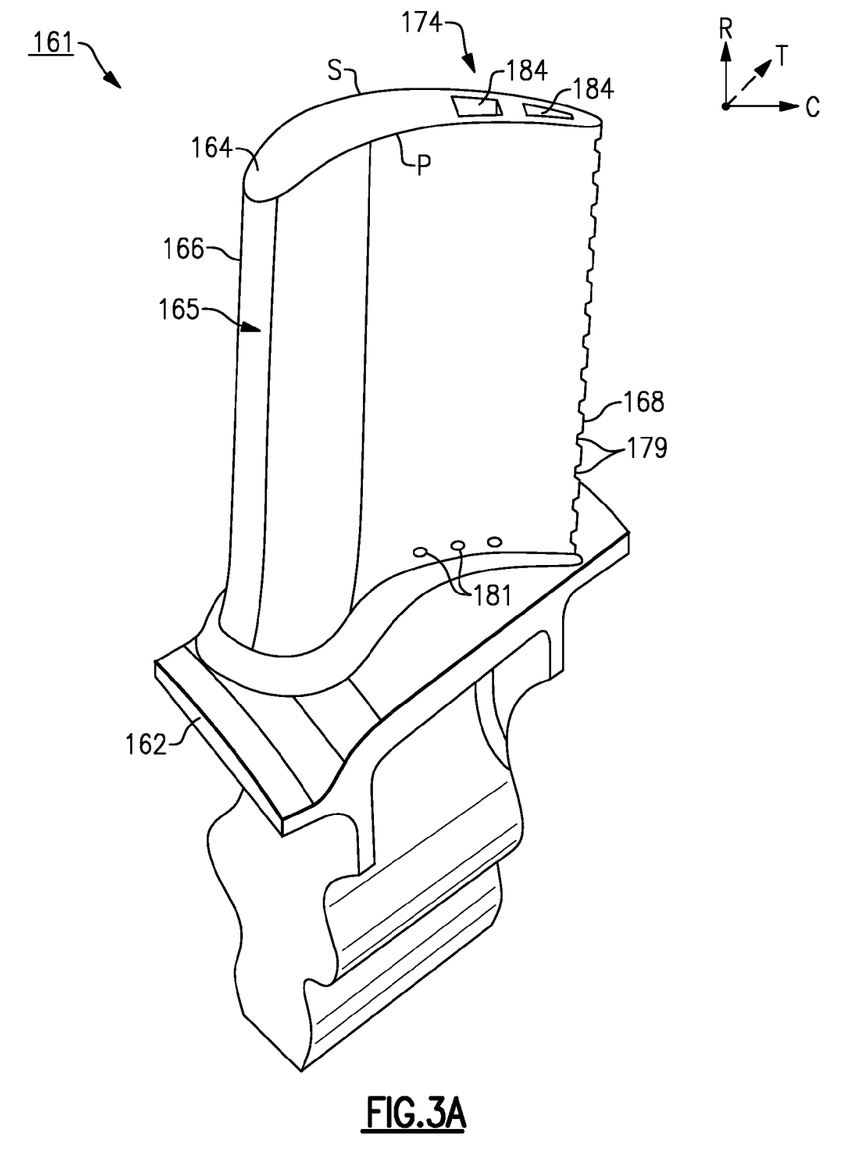
FIG. 3A illustrates a perspective view of an example airfoil.
Figure 3B:
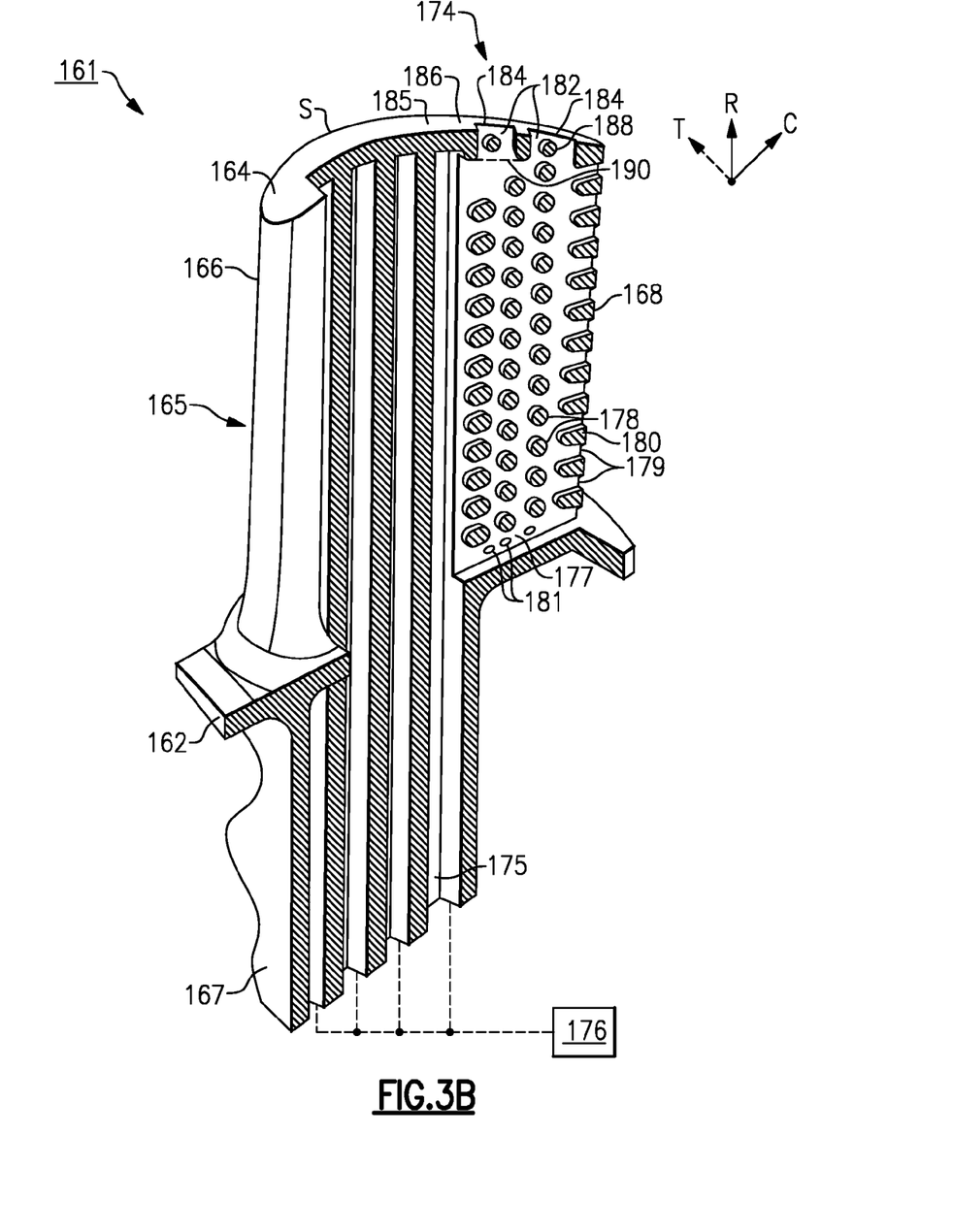
FIG. 3B illustrates a schematic cross-sectional view of the example airfoil of FIG. 3A.
Figure 3C:
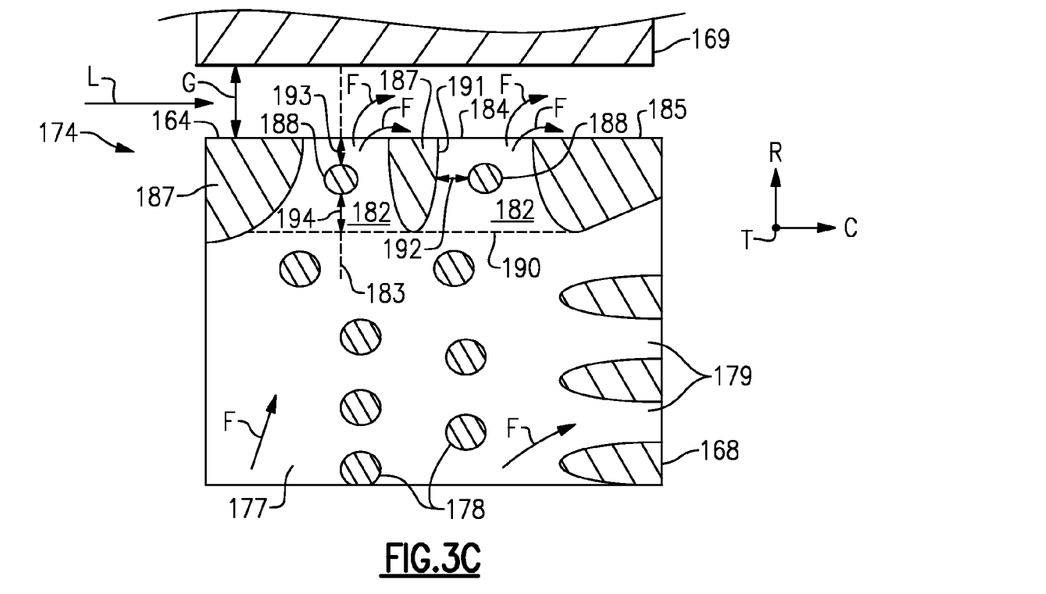
FIG. 3C illustrates a schematic cross-sectional view of selected portions of the example airfoil of FIG. 3B.

FIGS. 3A to 3C illustrate an exemplary cooling arrangement 174 for an airfoil 161, such as the one or more airfoils 61 of FIG. 2. One or more radial cooling passages 175 are provided between pressure and suction sides P, S of the airfoil 161 in a thickness direction T which is generally perpendicular to a chordwise direction C. Each radial cooling passage 175 generally extends from a root section 167 through the platform 162 and toward a tip 164 to communicate coolant to various portions of the airfoil 161. Each radial passage 175 is configured to receive coolant from a coolant source 176 (shown schematically). Coolant sources 176 can include, but are not limited to, bleed air from an upstream stage of the compressor section 24, bypass air, or a secondary cooling system aboard the aircraft, for example.

Figure 3D:
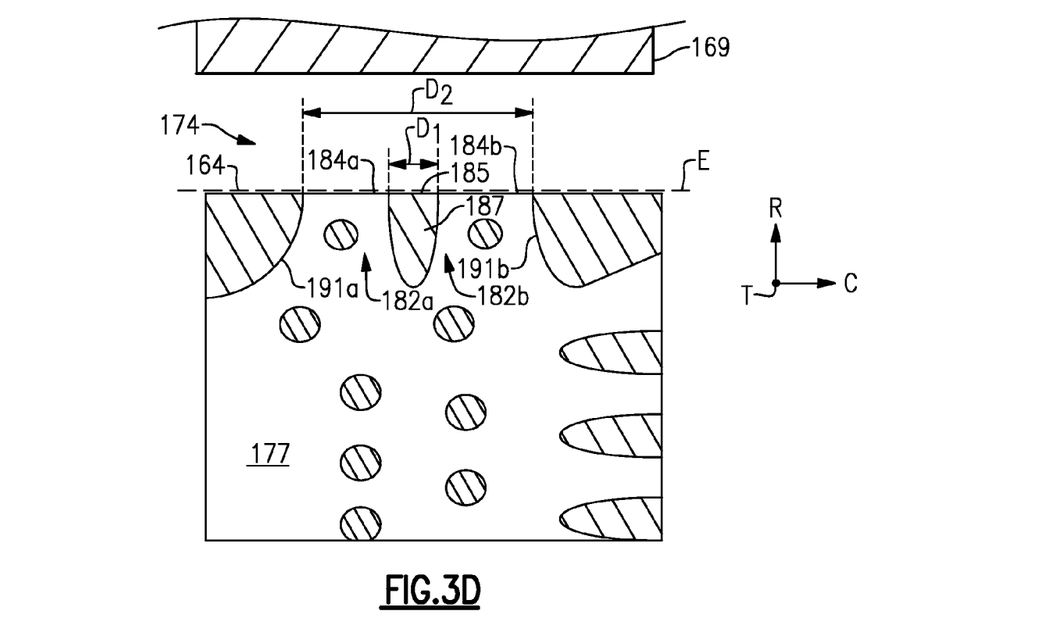
FIG. 3D illustrates a schematic cross-sectional view of selected portions of the example airfoil of FIG. 3B.

The airfoil section 165 has one or more internal cavities 177 extending in a radial direction between the platform 162 and the tip 164, and in a chordwise direction between the leading and trailing edges 166, 168. The internal cavity 177 is configured to receive coolant from one of the radial cooling passages 175 or another coolant source and to provide convective cooling to surrounding portions of the airfoil section 165. In some examples, one or more internal cooling features 178 are located within the cavity 177 to provide additional heat transfer augmentation to surrounding portions of the airfoil section 165 and to meter flow through the cavity 177. In one example, the internal cooling features 178 are a plurality of pedestals between opposed walls of the cavity 177, as illustrated in FIGS. 3B-3D. The internal cooling features 178 can be arranged to have various geometries including, but not limited to, any of the geometries discussed herein such as an elliptical, round, tapered, diffusing, and/or converging-diverging cross-sectional profiles.

In some examples, the internal cavity 177 is configured to communicate flow to one or more exit ports 179 or film cooling holes 181 (three shown for illustrative purposes) within an external wall 180 of the airfoil section 165. Although three film cooling holes 181 are shown in FIGS. 3A and 3B, in alternative embodiments the airfoil 161 includes fewer or more than three cooling holes 181 defined at various radial and chordwise locations. The exit ports 179 or film cooling holes 181 can be located at the trailing edge 168 or another location of the airfoil 161, for example, to exhaust the coolant into the core flow path C (shown in FIG. 2).

The cavity 177 is configured to communicate coolant to one or more cooling passages 182 of the cooling arrangement 174. Each cooling passage 182 is positioned adjacent to the airfoil tip 164 and is configured to eject coolant or fluid F from an exit port 184 onto an external surface 185 of the airfoil section 165 adjacent to the exit port 184, as illustrated in FIG. 3C, to provide film cooling and reduce localized heat flux and oxidation.

Each cooling passage 182 defines a passage axis 183 (shown in FIG. 3C) generally extending in the radial direction and is configured to intersect a surface of the blade outer air seal 169 bounding a radial gap G. The radial gap G is defined between the blade outer air seal 169 (only a portion shown) and the airfoil tip 164. The radial gap G is dimensioned to provide clearance during engine operation. The blade outer air seal 169 and the airfoil tip 164 are arranged to minimize flow of leakage air L from the core flow path C through the radial gap G. In some examples, the cooling passages 182 are configured to eject fluid F into the radial gap G to form a seal, thereby reducing the flow of leakage air L through the radial gap G.

The cooling passages 182 are bounded by one or more walls 191 of partition(s) 187, which can be arranged to space adjacent cooling passages 182 in the chordwise direction C. Each partition 187 extends radially between the airfoil tip 164 and the internal cavity 177 to direct flow from the cavity 177 to the cooling passages 182. As shown, each cooling passage 182 extends a distance in a chordwise direction less than a distance of the internal cavity 177 such that the internal cavity 177 converges at one or more cooling passages 182.

Although fluid F is illustrated as being ejected from exit ports 184 generally in the radial direction, in alternative embodiments the exit ports 184 are arranged to eject flow F in a direction having an axial or chordwise component. In this manner, internal flow separation can be reduced or minimized, and slot exit fill characteristics can also be increased or maximized based on external tangential and chordwise or axial pressure gradients.

The cooling arrangement 174 includes one or more internal features 188 positioned in each cooling passage 182. The internal feature 188 is spaced from wall 191 to define a throat 192 or minimum distance between the internal feature 188 and the wall 191. The throat 192 is configured to meter flow between an inlet port 190 of the cooling passage 182 and the exit port 184.

The internal features 188 can be positioned at various locations in the cooling passages 182 to meter flow. In some examples, at least some or each of the internal features 188 are spaced a distance 193 from each exit port 184 as shown in FIG. 3C. In this arrangement, the internal feature(s) 188 are recessed in board from the exit port(s) 184, which minimizes the effect of partial blockage of the exit port 184 during fabrication, machining, or repair of the airfoil 161, in which a coating can be deposited on a surrounding portion of the airfoil tip 164 around the exit ports 184. This arrangement also reduces or minimizes the sensitivity of cooling flow area reduction associated with blade tip surface interaction 164 with the blade outer air seal 69 during a core run-in cycle or rub-out condition in which the airfoil tip 164 impacts or otherwise engages the blade outer air seal 69.

In some examples, one or more internal features 188 are spaced a distance 193 of at least 1.0 hydraulic diameters from the exit port 184. In other examples, one or more internal features 188 are spaced no more than a distance 193 of 3.0 hydraulic diameters from the exit port 184, or no more than 2.0 hydraulic diameters from the exit port 184. In one example, one or more of the internal features 188 are spaced between 1.0 and 3.0 hydraulic diameters from the exit port 184. For circular internal features 188 the hydraulic diameter $Dh=4\ A/P$ is equal to the feature diameter. For alternative internal geometries other than circular shapes, the definition of Dh is a function of the internal feature 188 shape and the flow area 182. In this scenario and for the purposes of this disclosure, hydraulic diameter (Dh) is defined as $4\ A/P$, where A is the minimum cross-sectional flow area of the cooling passage 182 and P is the wetted perimeter along the cross-section of the cooling passage 182 which is coincident with the minimum cross-sectional flow area. In other examples, at least some of the internal features 188 are spaced a distance 194 from each inlet port 190 as shown in FIG. 3C. In one example, each internal feature 188 is spaced from each inlet port 190. In some examples, one or more internal features 188 are spaced from both the inlet port 190 and the exit port 184.

Positioning internal features 188 within the cooling passages 182 increases the film cooling characteristics of the cooling passages 182. As shown in FIG. 3D, the partition 187 defines a first distance D1 along an exit plane E at an external surface 185 of the airfoil tip 164. The outer walls 191*a*, 191*b* of adjacent cooling passages 182*a*, 182*b* define a second distance D2 along the exit plane E at exit ports 184*a*, 184*b*. Positioning the internal features 188 within the cooling passages 182 reduces a ratio of the first distance D1 to the second distance D2 such that a volume of coolant communicated from the exit ports 184*a*, 184*b* per unit length of the external surface 185 is increased. In some examples, a ratio of D1 to D2 is equal to or less than 0.5. In some examples, the ratio of D1 to D2 is equal to or less than 0.3, or equal to or less than 0.2. In one example, the ratio is equal to or greater than 0.1, or between 0.1 and 0.3.

The internal features 188 and side walls 187 can be arranged to affect the flow area relationship between the internal features 188 and side walls 187 in the cooling passages 182. For example, the internal features 188 and side walls 187 can be arranged and/or oriented to create either an accelerating or diffusing flow area based on local cooling flow. The internal features 188 and side walls 187 can be arranged and/or oriented to affect the internal convective heat transfer to surrounding portions of the airfoil 161, or the desired internal Mach number at the cooling passages 182 or exit ports 184, for example. The local slot heat transfer can be increased through a converging channel or cooling passage 182, as illustrated in FIG. 3C for example. High slot exit Mach numbers may also be desirable to mitigate tip leakage flow through the leakage gap G, thereby improving the overall performance and efficiency of the turbine and engine.

Figure 4A:
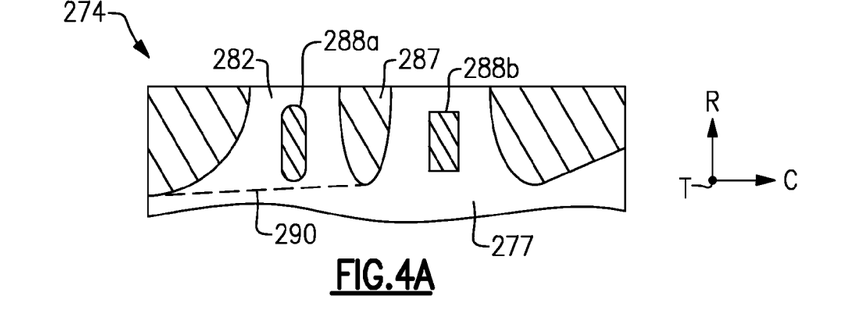
FIG. 4A illustrates a cooling arrangement for an airfoil according to a second embodiment.

FIGS. 4A to 4D illustrate example arrangements and geometries of internal features, such as internal features 188. In some examples, the cooling arrangement 274 includes one or more internal features 288*a* having a generally oblong geometry (FIG. 4A). In one example, internal feature 288*a* is radially aligned with the inlet port 290. In another example, internal feature 288*b* has a generally rectangular profile.

Figure 4B:
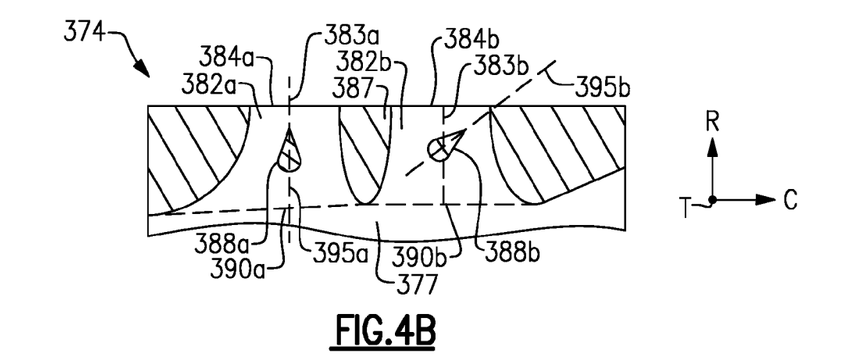
FIG. 4B illustrates a cooling arrangement for an airfoil according to a third embodiment.

In some examples, the cooling arrangement 374 includes one or more internal features 388 having a generally tear drop or tapered geometry (FIG. 4B). In one example, the internal feature 388*a* converges from an inlet port 390*a* to an exit port 384*a* to reduce wake shedding or flow separation of the coolant and also to reduce the ingestion of hot gases from the core flow path C in the cooling passage 282. In some examples, the feature axis 395 is skewed about ±45 degrees relative to the passage axis 383, as illustrated by internal feature 388*b*, and in other examples is skewed less than about ±45 degrees. In other examples, an internal feature 388*b* diverges from the inlet port 390*b* to the exit port 384*b*.

The internal features can be arranged at various orientations with respect to the cooling passage 282 to meter flow. In one example, a feature axis 395*a* defined by the internal feature 388*a* is aligned with the passage axis 383*a* of the cooling passage 382*a*. In another example, the feature axis 395*b* is skewed from the passage axis 383*b* of the passage 382*b*.

Figure 4C:
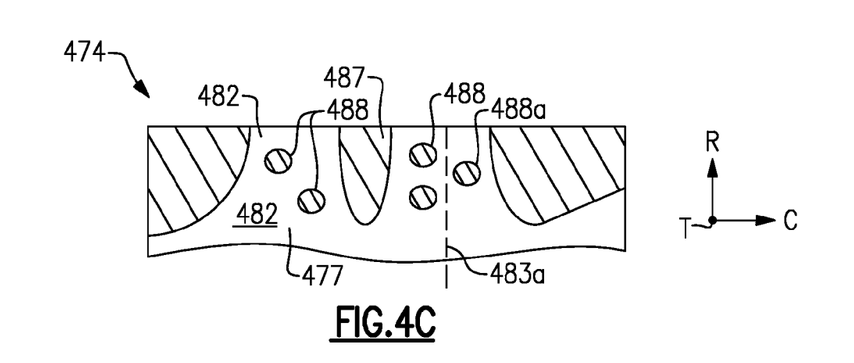
FIG. 4C illustrates a cooling arrangement for an airfoil according to a forth embodiment.

The internal features can have other geometries, such as an elliptical cross-sectional profile or pedestal 488 as shown in FIG. 4C, for example. More than one internal feature can be located in the cooling passage, illustrated by the arrangement of internal features 488. One or more internal features, such as internal feature 488*a*, can be offset from the passage axis 483*a*.

Figure 5A:
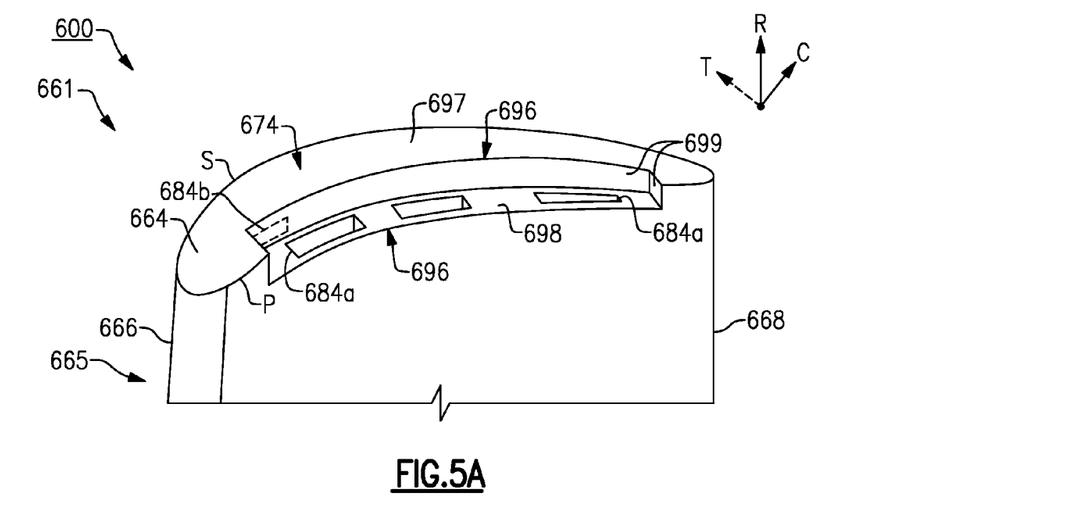
FIG. 5A illustrates a perspective view of an example airfoil according to a sixth embodiment.
Figure 5B:
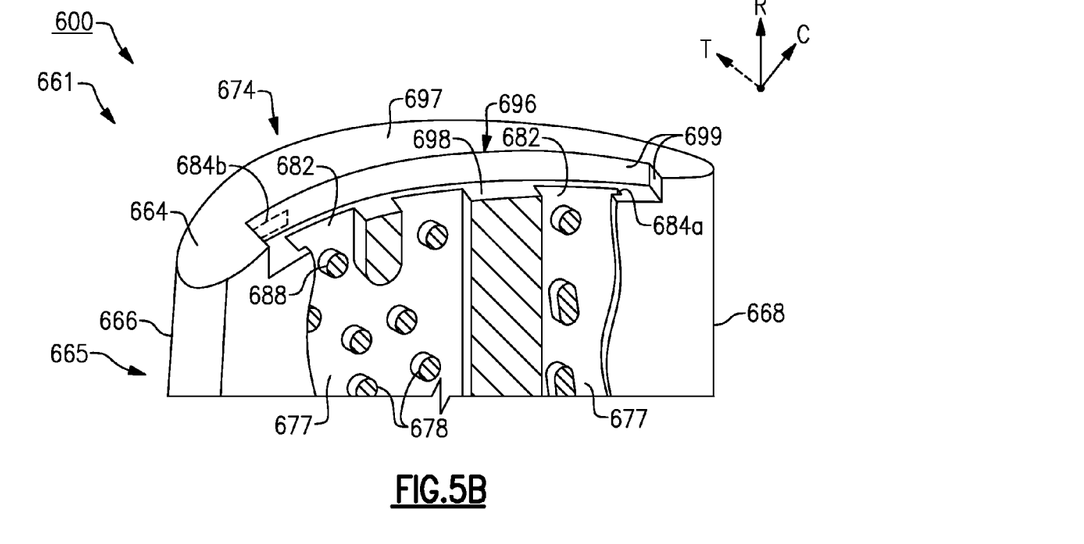
FIG. 5B illustrates a schematic cross-sectional view of the example airfoil of FIG. 5A.

FIGS. 5A and 5B illustrate an airfoil 661 having a cooling arrangement 674 according to an embodiment 600. Airfoil 661 defines a shelf 696 recessed in, or extending radially from, a sealing portion 697 of an airfoil tip 664. The shelf 696 includes a floor 698 spaced radially from the sealing portion 697 by one or more walls 699 of the shelf 696. One or more exit ports 684 of the cooling passages 682 are located within the shelf 696 to eject a coolant or fluid into the shelf 696 utilizing any of the techniques discussed herein. The exit ports 684 can have, but are not limited to, a rectangular geometry or slot profile as shown. In some examples, one or more exit ports 684*a* are radially aligned with the floor 698. In another example, one or more exit ports 684*b* are positioned on another surface of the shelf 696 such as one of the walls 699.

In some examples, the sealing portion 697 includes a sealing surface configured to provide a seal with a portion of a gas turbine engine. In one example, the sealing surface includes a radially outermost portion of an airfoil tip 664. The seal can be defined in a radial gap, such as the radial gap G illustrated in FIG. 3C, to reduce the amount of leakage air through the radial gap. The shelf 696 can extend from a pressure side P of the airfoil section 665, for example, or another portion of the airfoil section 665.

As shown in FIG. 5B, one or more internal features 688 are positioned in the cooling passages 682 utilizing any of the techniques discussed herein. The internal features 688 are configured to meter a coolant or fluid communicated to the cooling passage 682. The fluid is ejected from the exit port 684 to surrounding portions of the shelf 696. Positioning the internal features 688 in this manner reduces erosion of the internal features 688 during a rub-out condition, such that the cooling passages 682 are able to continue communicating coolant to portions of the airfoil tip 664 adjacent the shelf 696.

Figure 6:
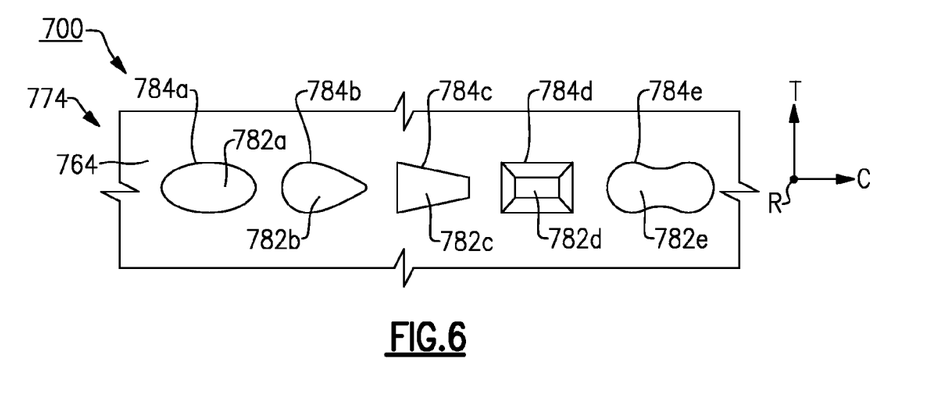
FIG. 6 illustrates a cooling arrangement for an airfoil according to a seventh embodiment.
Figure 7:
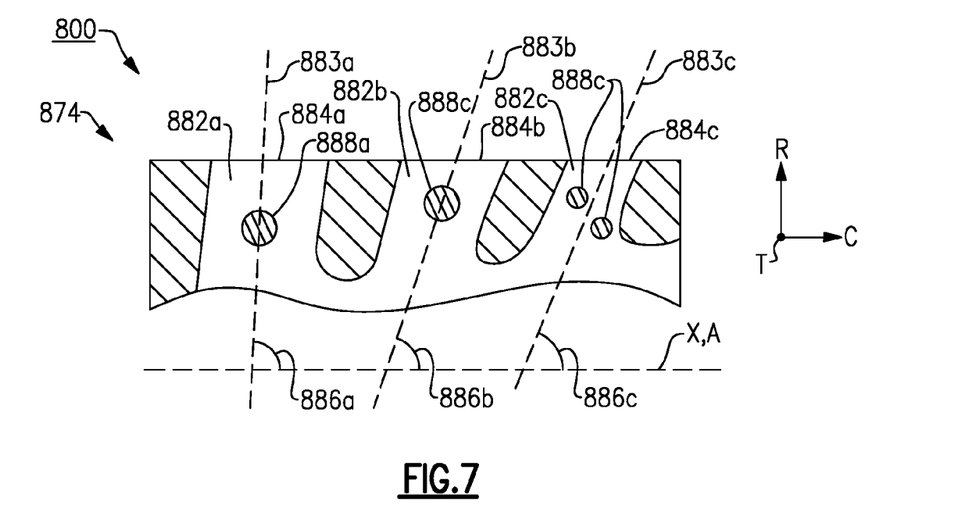
FIG. 7 illustrates a cooling arrangement for an airfoil according to an eighth embodiment.

FIG. 6 illustrates selected portions of an airfoil 774 adjacent to an airfoil tip 764. In this example, the exit ports 784 are arranged having various geometries as illustrated by embodiment 600. In one example, the exit ports have a different geometry or shape such as, but not limited to, an elliptical or round geometry 784*a*. Curving at least a perimeter of the exit slot 784*a* can reduce stress concentrators in adjacent locations. Other exit ports geometries can include a teardrop geometry 784*b*, a tapering geometry 784*c*, a diffusing geometry 784*d*, and/or a converging-diverging geometry 784*e*, for example. Other geometries can be utilized depending on the needs of a particular situation to provide the desired exit flow such as one or more exit ports having a rectangular cross-section or profile as illustrated by exit port 684*a* (shown in FIG. 5A).

Referring to FIG. 6, the cooling passages 882 can be arranged having various geometries as illustrated by embodiment 800. Each passage axis 883 can be oriented relative to a reference axis X, such as then engine axis A, to define a passage angle 886. Two or more cooling passages 882*a*, 882*b*, 882*c* can be arranged at different radial and axial orientations along the axial direction of the blade tip chord (or reference axis X) in order to best match local streamline characteristics, and mitigate internal separation of discharge slot cooling flow. Arranging the cooling passages 882 according to a desired local slot fill can increase local geometric film coverage and film effectiveness, thereby reducing the localized heat flux, improving local tip durability, and reducing the overall tip cooling flow requirements. As shown, the cooling passages 882 can be configured in a fanning arrangement such that each passage angle 886 differs relative to the axial direction or reference axis X, and may decrease in the axial direction from a leading edge to a trailing edge of the airfoil, as illustrated by cooling passages 882a, 882b and 882c. Each passage angle 886 in the fanning arrangement can be selected according to the pressure gradient at the corresponding exit slots 884, for example.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

We claim:

1. A turbine blade, comprising:
   a platform and an airfoil tip;
   an airfoil section between the platform and the airfoil tip, the airfoil section having a cavity spaced radially from the airfoil tip;
   a plurality of cooling passages radially between the cavity and the airfoil tip, each of the plurality of cooling passages defining an exit port adjacent the airfoil tip;
   an internal feature within each of the plurality of cooling passages configured to meter flow to the exit port; and
   wherein the airfoil section defines a shelf in the airfoil tip radially inward of a sealing portion of the airfoil tip, the shelf including walls between the sealing portion and a floor to define a recess, the exit port is located in the shelf along a surface of the floor, and the plurality of cooling passages are defined in the floor.

2. The turbine blade of claim 1, wherein each of the cooling passages is configured to eject coolant onto an external surface of the airfoil tip.

3. The turbine blade of claim 1, wherein each of plurality of cooling passages defines an inlet port at the cavity, and the internal feature is spaced from the inlet port.

4. The turbine blade of claim 1, wherein each exit port of the plurality of cooling passages includes one of a rectangular, elliptical, round, oval, teardrop, tapering, diffusing and converging-diverging geometry.

5. The turbine blade of claim 1, comprising at least one cooling feature within the cavity.

6. The turbine blade of claim 5, wherein the at least one cooling feature is a plurality of pedestals between opposed walls of the cavity.

7. The turbine blade of claim 1, wherein the shelf extends between a leading edge and a trailing edge of the airfoil section.

8. The turbine blade of claim 1, wherein the sealing portion includes a sealing surface configured to provide a seal with a portion of a gas turbine engine.

9. The turbine blade of claim 1, wherein at least one throat is defined between the internal feature and a wall of one of the plurality of the cooling passages.

10. The turbine blade of claim 1, wherein the exit port and the internal feature are spaced from a leading edge and a trailing edge of the airfoil section.

11. A gas turbine engine, comprising:
    a rotor spaced radially from a blade outer air seal; and
    wherein the rotor comprises:
       a platform and an airfoil tip;
       an airfoil section between the platform and the airfoil tip, the airfoil section having a cavity between pressure and suction sides of the airfoil section;
       a plurality of cooling passages radially between the airfoil tip and the cavity, the plurality of cooling passages defining an array of exit ports adjacent the airfoil tip, the array of exit ports configured to eject fluid onto external surfaces of the airfoil tip;
       a plurality of internal features within the plurality of cooling passages configured to meter flow to the array of exit ports; and
       wherein the airfoil section defines a shelf in the airfoil tip radially inward of a sealing portion of the airfoil tip, the shelf including walls between the sealing portion and a floor to define a recess, the array of exit ports are radially aligned with a surface of the shelf, and the plurality of cooling passages are defined in the floor.

12. The gas turbine engine as recited in claim 11, wherein each of the plurality of cooling passages defines a passage axis intersecting a surface of the blade outer air seal.

13. The gas turbine engine as recited in claim 11, wherein the airfoil tip and the blade outer air seal are spaced radially to define a radial gap, and the array of exit ports are configured to eject fluid into the radial gap to form a seal.

* * * * *